(No Model.)  2 Sheets—Sheet 1.
F. E. IVES.
CAMERA.

No. 475,084. Patented May 17, 1892.

Witnesses:
Hamilton D. Turner
Alex. Barkoff

Inventor:
Frederic E. Ives
by his Attorneys
Howson & Howson (No Model.) 2 Sheets—Sheet 2.

F. E. IVES.
CAMERA.

No. 475,084. Patented May 17, 1892.

Witnesses:
Hamilton D. Turner
Alex. Barkoff

Inventor:
Frederic E. Ives
by his Attorneys
Howson & Howson

UNITED STATES PATENT OFFICE.

FREDERIC E. IVES, OF PHILADELPHIA, PENNSYLVANIA.

CAMERA.

SPECIFICATION forming part of Letters Patent No. 475,084, dated May 17, 1892.

Application filed February 12, 1892. Serial No. 421,228. (No model.)

*To all whom it may concern:*

Be it known that I, FREDERIC E. IVES, a citizen of the United States, and a resident of Philadelphia, Pennsylvania, have invented certain Improvements in Cameras, of which the following is a specification.

The object of my invention is to provide a camera whereby there can be produced upon the same plate three or more images all from the same point of view or showing the same perspective, the device when used in the reverse way being also capable of superposing the several images, so that they will form but one picture at the point of view or can be projected as one picture upon a screen or other background. This object I accomplish in the case of the camera by dividing the incident rays and reflecting said divided rays so as to form the desired number of different images; or the rays from the different images are reflected, collected, and projected in the same axial line when it is desired to superpose the images and form a single picture.

The camera has been especially devised for carrying out the invention of composite heliochromy, forming the subject of my patent, No. 432,530, dated July 22, 1890.

Figure 1:
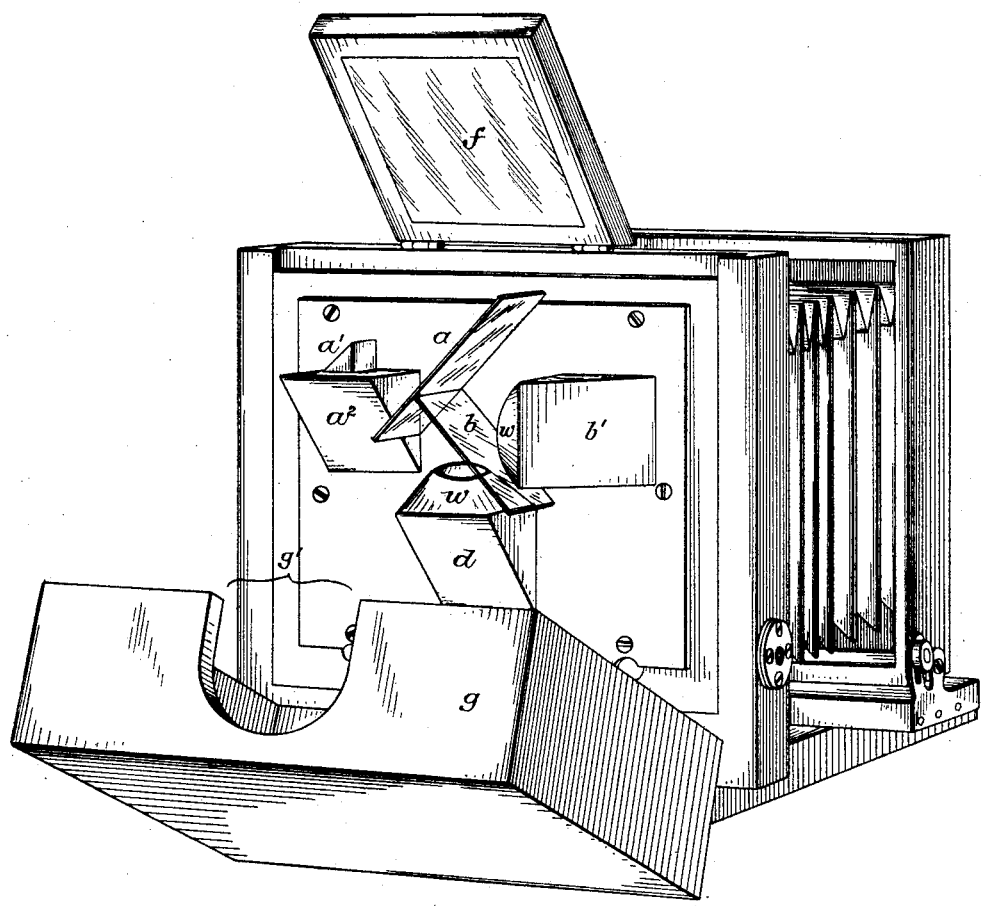
Figure 5:
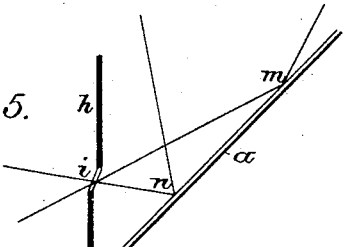
Figure 2:
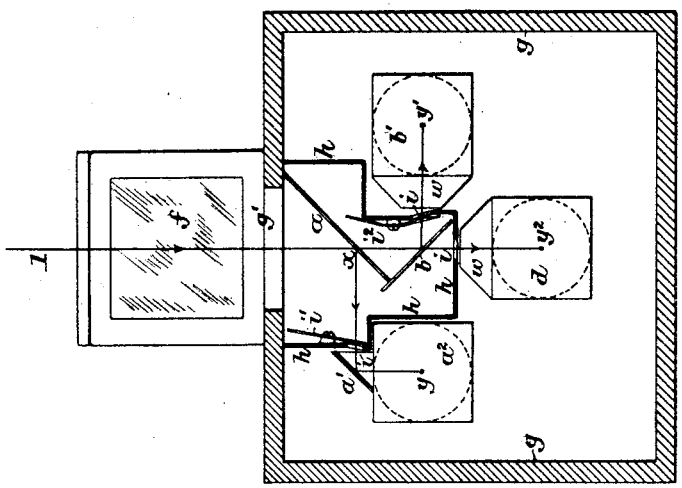
Figure 3:
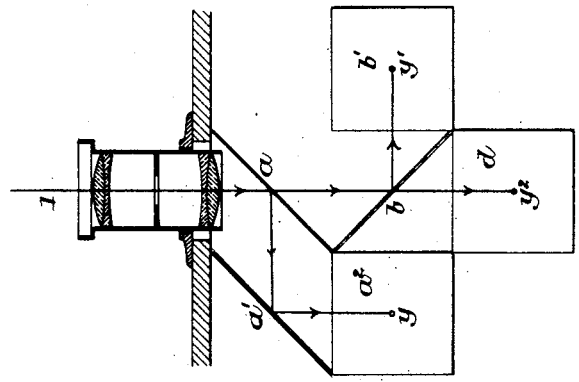
Figure 4:
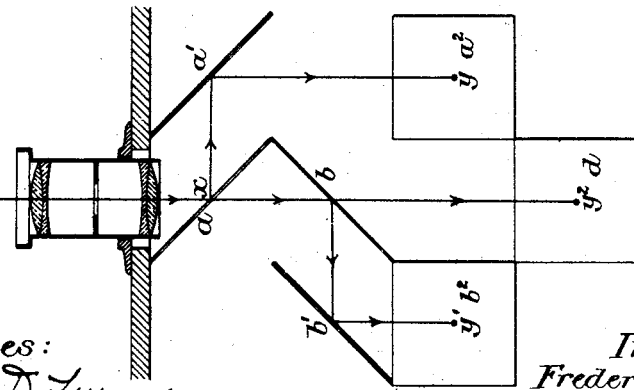

In the accompanying drawings, Figure 1 is perspective view of an ordinary photographic camera provided with attachments in accordance with my invention. Fig. 2 is a diagrammatic representation of the parts to which my invention relates. Figs. 3 and 4 are like diagrammatic representations illustrating other plans of carrying out my invention, and Fig. 5 is an enlarged diagram illustrating one of the features of my invention.

My invention may be stated generally as comprising a system or series of reflecting devices, said series comprising as many members as there are images to be produced, all of the members excepting the last comprising two or more mirrors and the last member having one or more mirrors, all of said mirrors being disposed at such angles as to project the images to the desired points, the first mirror of each member of the series being in the axial line of the incident or undivided rays, and the secondary mirror or mirrors of those members of the series in which such secondary mirrors are used being properly disposed with reference to the said axial mirror, and some of said axial mirrors being transparent or semi-transparent, so as to serve to transmit rays as well as to reflect the same. Hence, when the incident rays strike the axial mirror of the first member of the series there will be a division of said rays, a part of each ray being reflected and a part being transmitted to the axial mirror of the second member of the series, where each ray will be again divided, part being reflected and part transmitted, and so on, if more than two transparent axial mirrors are used.

In the camera shown in Fig. 1 and in the diagram Fig. 2 the reflecting system is intended for the production of three images, and therefore comprises three members, the first member consisting of the transparent axial mirror $a$ and secondary opaque mirrors $a'$ and $a^2$, while the second member consists of the transparent axial mirror $b$ and the opaque secondary mirror $b'$, the third member consisting, simply, of the opaque axial mirror $d$. The axial line of the incident rays is represented by the arrow 1 in Fig. 2. Hence it will be seen that these rays striking the mirror $a$ of the first member of the series are divided, a certain volume of each ray being reflected laterally onto the mirror $a'$, thence onto the mirror $a^2$, and thence onto the plate on which the images are to be produced, a certain volume of each ray being also transmitted through the mirror $a$, so as to strike the mirror $b$, whereby the rays are again divided, a certain volume of each ray being reflected laterally onto the mirror $b'$, and thence again reflected onto the plate, while the rays transmitted through the mirror $b$ strike the mirror $d$ and are thereby reflected directly onto the plate. The mirrors are so arranged, however, that the length of each ray in its passage from the object which is being photographed to the plate on which the images are to be produced is the same, whether said ray is reflected once, twice, or thrice in its passage, as will be readily understood on reference to the lines indicating the axial lines of the rays in the diagram Fig. 2.

The mirrors $a^2$, $b'$, and $d$ are all at the same distance from the plate, and it will be seen that the length of each divided ray from the point of first division and reflection—say the point $x$—to the points of final reflection—say at $y$, $y'$, and $y^2$—is the same. Hence all of the images are exactly alike as regards focus, perspective, and point of view. It will be observed that all of the divided rays are projected finally in a direction at right angles to the line of incident rays striking the mirror $a$. Hence in applying my invention to an ordinary camera it may be advisable to mount upon the camera a preliminary reflector $f$ to reflect at a right angle the rays coming from the object to be photographed, so that the camera can be used in the same position as an ordinary camera—that is to say, facing the object. The mirrors constituting the various members of the reflecting series may, however, be so arranged as to project the divided rays in lines parallel with the incident rays. For instance, each member of the series may consist of an axial mirror and of one secondary mirror, so placed in respect to the axial mirror as to project the divided rays rearward or in the line of said incident rays. It is also preferable to inclose the reflecting devices, so as to eliminate rays of light other than those proceeding from the object to be photographed. Hence I provide the front of the camera with box or casing $g$, having an aperture $g'$ in one of its sides, this box being hinged to the camera-front, so that it can be readily moved out of the way when it is desired to gain access to the reflecting devices.

The construction shown in Figs. 1 and 2 contemplates the employment of condensing-lenses in the paths of the divided rays—such lenses, for instance, being located as shown by the dotted circles in Fig. 2; but it will be evident that a single condensing-lens in the path of the incident rays can be used, if desired; and in Fig. 3 I have shown an instance of such use, the mirrors comprising the different members of the reflecting series being arranged in a manner substantially the same as shown in Figs. 1 and 2, while in Fig. 4 I have shown a somewhat different arrangement of mirrors, the first and second members of the series both having two secondary mirrors, those of the first member being represented at $a'$ and $a^2$ and those of the second member at $b'$ and $b^2$.

As shown in Fig. 1, the mirrors constituting the various members of the reflecting series consist of rectangular prisms, and in order to prevent cross-reflections from the front faces of the prisms $b'$ and $d$ and also to make the rays which pass through the said prisms traverse the same thickness of glass as in the two prisms $a'$ and $a^2$ said prisms $b'$ and $d$ have their front faces extended, as shown at $w$ in Fig. 2.

In Figs. 3 and 4 I have shown compound lenses with diaphragms in the lens-tube; but in Fig. 2 I have shown a diaphragm $h$, having three apertures $i$, one in front of the mirror $a'$, one in front of the mirror $b'$, and the other in front of the mirror $d$, so that the amount of light transmitted to each portion of the plate can be governed independently.

The apertures in front of the mirrors $a'$ and $b'$ are inclined slightly in respect to the axial line of the incident rays, so as to compensate for unequal reflection from the mirrors $a$ and $b$, it being apparent that a ray striking a transparent mirror—say, as indicated at $m$ in Fig. 5—will be reflected with greater intensity than a ray striking the mirror as indicated at $n$ in the same figure. Hence when the aperture in the diaphragm is inclined in respect to the axial line of the incident rays, as shown in said diagram Fig. 5, the effective size of the aperture in the direction of a ray proceeding from the point $m$ is less than the effective size of the aperture in the direction of a ray proceeding from the point $n$, so that the bundle of stronger rays is smaller than the bundle of weaker rays, and the illumination is thereby equalized.

When an adjustable diaphragm is employed, it is also mounted so as to move in a plane at an angle to the axial line of the incident rays—as shown, for instance, in Fig. 2, where $i'$ $i^2$ represent pivoted diaphragms so mounted, the diaphragm $i^2$ being conical, so that it will not interfere with the transmission of rays from the mirror $a$ to the mirror $b$.

Where the angle of view is small, inclined apertures will not be necessary, and in such cases the construction shown in Figs. 3 and 4 may be adopted.

When the camera is used as a transmitting-camera, the rays of light passing through the separate images upon the plate in the reverse direction from that indicated by the arrows in Fig. 2 are reflected by the various members of the reflecting-series onto the axial mirrors, whereby they are all projected in the same axial line to one point—such as an eye-piece or screen—the various images being superposed at that point, so as to produce a single picture, which will be perfect as regards focus and perspective, owing to the fact that the series of images was originally produced from the same point of view and by rays of precisely the same length. It will be evident that by simply increasing the number of members in the reflecting-series the number of images produced may be increased accordingly without departing from the spirit of my invention. In some cases the desired location of the different images upon the plate may, as before stated, render it advisable to employ a secondary reflector, in combination with the reflector $d$, constituting the third member of the series; but, as shown by the drawings, this is not essential when the images are projected in a direction at right angles to the incident or undivided rays. The reflector $d$ might also be transparent; but as the volume of light reaching the same is limited an opaque reflector at that point is of course always to be preferred. The axial reflectors in advance of the reflector $d$ are, however, necessarily transparent.

The transparent reflectors may be of glass, either platinized or thinly or incompletely silvered, colored, or uncolored. When uncolored glass is used for transparent reflectors in advance of the lenses, as in Fig. 2, it should be thin and have perfectly parallel surfaces in order that the two reflections—one from each surface of the glass—shall be practically coincident for objects at a considerable distance from the camera and the image free from doubling of outline.

When objects are very near to the camera or when the plain-glass reflectors are used between the condensing-lens and the sensitive plate, one plane surface should be very slightly inclined in respect to the other in such direction and to such degree as will make the two reflections practically coincident at the focus of the condensing lens or lenses.

Having thus described my invention, I claim and desire to secure by Letters Patent—

1. In a camera for producing or superposing a number of images which are in the same plane and show the same perspective, reflecting devices comprising a series of inclined reflectors located one behind the other in the axial line of the incident or undivided rays, said reflectors facing in different directions and some of them being transparent, and secondary inclined reflectors combined with the necessarily transparent axial reflectors, the whole being arranged substantially as and for the purpose set forth.

2. In a camera for producing or superposing a number of images which are in the same plane and show the same perspective, reflecting devices comprising a series of inclined reflectors located one behind the other in the axial line of the incident or undivided rays, said reflectors facing in different directions and some of them being transparent, secondary inclined reflectors combined with the necessarily transparent axial reflectors and arranged in respect thereto substantially as set forth, and an apertured diaphragm for the reflecting devices for each image, substantially as specified.

3. In a camera for producing or superposing a number of images which are in the same plane and show the same perspective, reflecting devices comprising a series of inclined reflectors located one behind the other in the axial line of the incident or undivided rays, said reflectors facing in different directions and some of them being transparent, secondary inclined reflectors combined with the necessarily transparent axial reflectors, and an apertured diaphragm for the reflecting devices for each image, the apertures of some of said diaphragms being in planes inclined in respect to the axial line of the incident or undivided rays, substantially as specified.

4. In a camera for producing or superposing a number of images which are in the same plane and show the same perspective, reflecting devices comprising a series of inclined reflectors located one behind the other in the axial line of the incident or undivided rays, said reflectors facing in different directions and some of them being transparent, secondary inclined reflectors combined with the necessarily transparent axial reflectors and arranged in respect thereto as set forth, and an apertured diaphragm for the reflecting devices for each image, some of said diaphragms being movable in planes inclined in respect to the axial line of the incident or undivided rays, substantially as specified.

5. In a camera for producing or superposing a number of images which are in the same plane and show the same perspective, reflecting devices comprising a series of reflectors located one behind the other in the axial line of the incident or undivided rays, said reflectors facing in different directions and some of them being transparent, secondary inclined reflectors combined with the necessarily transparent axial reflectors and arranged in respect thereto as set forth, and a supplementary reflector in advance of the main reflectors, whereby the incident or undivided rays are deflected at a right angle, substantially as specified.

6. In a camera for producing or superposing a number of images which are in the same plane and show the same perspective, reflecting devices comprising a series of reflectors located one behind the other in the axial line of the incident or undivided rays, said reflectors facing in different directions and some of them being transparent, secondary inclined reflectors combined with the necessarily transparent axial reflectors and arranged in respect thereto as set forth, and an apertured box or casing supplementary to the camera-box inclosing said reflecting devices, substantially as specified.

In testimony whereof I have signed my name to this specification in the presence of two subscribing witnesses.

FREDERIC E. IVES.

Witnesses:
   EUGENE ELTERICH,
   HARRY SMITH.